(No Model.)
A. CHARLES.
HORSE COLLAR.
No. 431,558. Patented July 8, 1890.
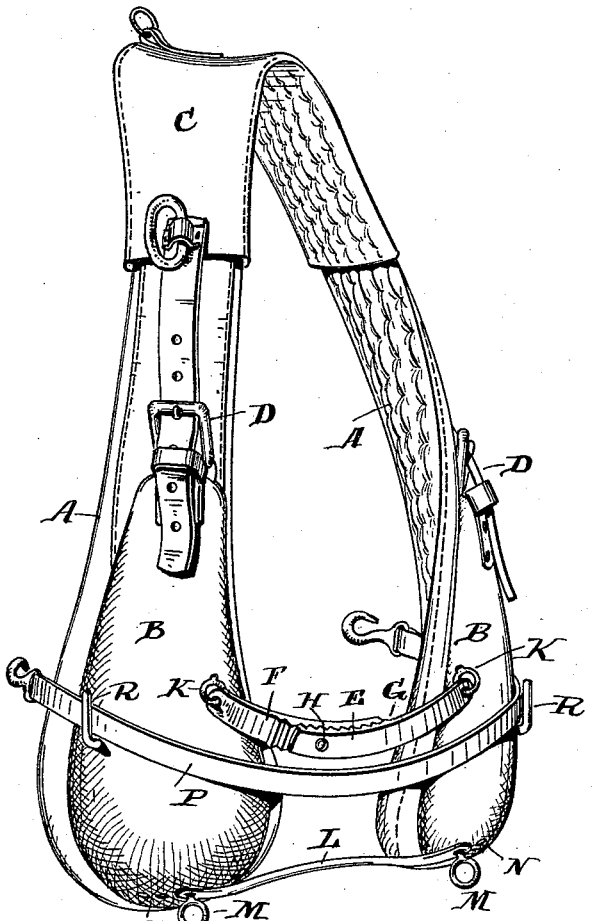
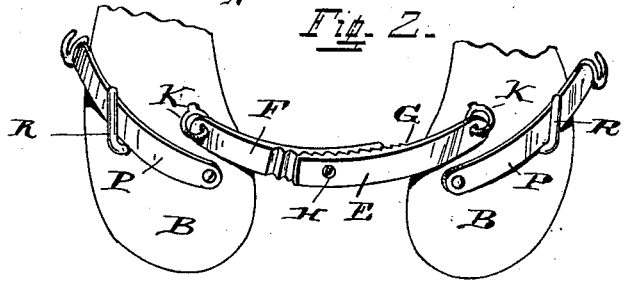
Attest
Ed. Strehli
H. F. Kohing
Inventor
August Charles
by Strehli & Hill Atty's.

UNITED STATES PATENT OFFICE.

AUGUST CHARLES, OF CINCINNATI, OHIO.

HORSE-COLLAR.

SPECIFICATION forming part of Letters Patent No. 431,558, dated July 8, 1890.

Application filed October 11, 1889. Serial No. 326,660. (No model.)

*To all whom it may concern:*

Be it known that I, AUGUST CHARLES, a citizen of the United States, residing at Cincinnati, in the county of Hamilton, State of Ohio, have invented certain new and useful Improvements in Collars for Horses, of which the following is a specification, reference being had to the accompanying drawings.

The object of my invention is to construct a collar for horses in such a manner as to dispense with the use of hames and extra neck and sweat pads, and at the same time produce a collar which, after having been fitted to the shoulders of the horse, will accommodate or adjust itself to all the movements or positions of the horse when pulling—that is, as the pulling-strain is alternated from one shoulder to the other the strain will be equalized and the collar be made to adjust itself properly to the shoulders of the horse.

In the accompanying drawings, Figure 1 is a perspective view of my improved collar as preferably constructed; and Fig. 2 is a modified view of the lower part of the collar plates or blocks, the lower adjusting-bar L shown in Fig. 1 being dispensed with.

My improved collar is made up of the flexible side pieces A A, blocks or plates B B, adjustable connecting-piece E, and (when constructed as shown in Fig. 1) the bar L. The top end portions of the flexible sides preferably fit into the neck-pad C, the latter being held in place in any suitable manner, a strap-and-buckle connection D being shown for shortening or lengthening the collar; but this does not constitute a feature of my invention, as the connection between the top end portions of the flexible side pieces may be accomplished in various ways.

My invention consists in attaching to the lower end portions of the flexible side pieces A A the blocks or plates B B, made of suitable shape to conform to the shoulders of the horse, said blocks or plates being separated and connected by an adjustable piece, as E, for widening or contracting the blocks, and with them the flexible portion of the collar, to which they are attached, to fit different-sized horses. The flexible side pieces are preferably stuffed or padded, as desired. The adjustable connection between the blocks for widening or contracting the collar at that point may be formed in any suitable manner, my mode being shown at E, which consists of the serrated or toothed pieces F and G, which are made to curve outward and engage each other, as shown, and when properly adjusted the pieces F and G are secured together by means of the set-screw H. Having adjusted this portion of the collar to the lower part of the neck of the horse, it is very desirable that the upper portion of the blocks be brought in close to the neck, in order that the strain may be uniform against the shoulders over the entire surface of the collar covered by the blocks. I have shown two modes of accomplishing this result. When constructed as shown in Fig. 1, the draft-strap P extends continuously around about the middle of the blocks B, and is connected to said blocks by suitable hooks, as R, a suitable bar, as L, being connected to the lower end portion of the blocks or plates. This bar has an opening in each end thereof, through which the screw-eyes M pass and fit into the holes N in the blocks, as shown. Two or more holes may be formed in each block, as required. When desired to bring and retain the top portion of the blocks close to the neck of the horse, the screw-eyes M are removed and the lower end portions of the blocks are pushed outward, which will cause a reverse movement at the top portion, as the connecting-points K, between the blocks and the adjustable connecting-piece, serve as a pivotal point on which to regulate said blocks or plates. When constructed as shown in Fig. 2, the bar L may be dispensed with, for in this latter construction the tugs P P are loosely connected to the blocks at such a point below the pivotal points K as that the strain in pulling will cause the upper portions of the blocks, and with them that portion of the collar, to be drawn in close to the horse's neck. The collar is put to place over the horse's head, as the flexible side pieces above the blocks will permit of the collar being widened out for this purpose.

The advantages of my improved collar are apparent. The means afforded for adjusting the collar-blocks laterally and for adjusting the top portions of the blocks to the horse's neck, so that a uniform strain will be produced against the shoulders over the entire surface of the blocks, is a very great advantage to prevent chafing, and, the collar being divided at its lower end, it is impossible to choke the horse.

What I claim as new, and desire to secure by Letters Patent, is—

1. A collar consisting of the flexible side portions A A, suitably connected at top, blocks B B, attached to said side portions at the lower end thereof, adjustable connecting-piece, as E, composed of the serrated pieces F and G, connected at one end to said blocks, and screw H, substantially as specified.

2. A horse-collar consisting of the flexible side portions A A, suitably connected at top, blocks B B, connected to said flexible side portions at the lower end thereof, an adjustable connection between said blocks for widening or contracting the collar at that point, and suitable means, as bar L, for bringing the upper portions of the blocks close to the neck of the horse, as and for the purposes specified.

AUG. CHARLES.

Witnesses:
W. S. HARTLEY,
ED. STREHLI.

Correction in Letters Patent No. 431,558.

It is hereby certified that in Letters Patent No. 431,558, granted July 8, 1890, upon the application of August Charles, of Cincinnati, Ohio, for an improvement in "Horse-Collars," an error appears in the printed specification requiring correction, as follows: In line 53, page 1, the word "my" should read *one;* and that the said Letters Patent should be read with this correction therein that the same may conform to the record of the case in the Patent Office.

Signed, countersigned, and sealed this 22d day of July, A. D. 1890.

[SEAL.]
CYRUS BUSSEY,
*Assistant Secretary of the Interior.*

Countersigned:
C. E. MITCHELL,
*Commissioner of Patents.*